United States Patent
Chaudhary et al.

(10) Patent No.: US 9,394,425 B2
(45) Date of Patent: Jul. 19, 2016

(54) ACETYLATED POLYOL HYDROXYSTEARATE PLASTICIZERS AND PLASTICIZED POLYMERIC COMPOSITIONS

(71) Applicants: Bharat I. Chaudhary, Princeton, NJ (US); Beate Sczekalla, Kabelsketal-Zwintschoena (DE)

(72) Inventors: Bharat I. Chaudhary, Princeton, NJ (US); Beate Sczekalla, Kabelsketal-Zwintschoena (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/395,390

(22) PCT Filed: May 7, 2013

(86) PCT No.: PCT/US2013/039840
§ 371 (c)(1),
(2) Date: Oct. 17, 2014

(87) PCT Pub. No.: WO2013/191812
PCT Pub. Date: Dec. 27, 2013

(65) Prior Publication Data
US 2015/0129279 A1 May 14, 2015

Related U.S. Application Data

(60) Provisional application No. 61/663,261, filed on Jun. 22, 2012.

(51) Int. Cl.
*H01B 7/00* (2006.01)
*C08K 5/103* (2006.01)
*H01B 3/44* (2006.01)
*C08K 5/1515* (2006.01)
*H01B 3/42* (2006.01)

(52) U.S. Cl.
CPC .............. *C08K 5/103* (2013.01); *C08K 5/1515* (2013.01); *H01B 3/44* (2013.01); *H01B 3/443* (2013.01); *H01B 3/427* (2013.01)

(58) Field of Classification Search
USPC .................. 174/110 R–110 A, 120 R, 121 R
See application file for complete search history.

(56) References Cited

U.S. PATENT DOCUMENTS

| | | | |
|---|---|---|---|
| 2,397,592 A | 4/1946 | Blades | |
| 2,403,215 A | 7/1946 | Foster | |
| 2,458,484 A | 1/1949 | Terry et al. | |
| 2,500,918 A | 3/1950 | Rueter et al. | |
| 2,618,622 A | 11/1952 | Grummit et al. | |
| 2,666,752 A | 1/1954 | Grummit et al. | |
| 3,138,566 A | 6/1964 | Arnold | |
| 3,381,837 A | 5/1968 | Testa et al. | |
| 3,409,580 A | 11/1968 | Alzner | |
| 3,451,958 A | 6/1969 | Riedeman et al. | |
| 3,639,318 A | 2/1972 | Tijunelis et al. | |
| 3,668,091 A | 6/1972 | French et al. | |
| 3,712,875 A | 1/1973 | Tijunelis | |
| 3,778,465 A | 12/1973 | Barnstorf | |
| 3,780,140 A | 12/1973 | Hammer | |
| 3,868,341 A | 2/1975 | Sauer et al. | |
| 3,872,187 A | 3/1975 | Fath | |
| 3,891,694 A | 6/1975 | Mills et al. | |
| 4,083,816 A | 4/1978 | Frankel et al. | |
| 4,346,145 A | 8/1982 | Choi et al. | |
| 4,421,886 A * | 12/1983 | Worschech | C08K 3/0091 524/310 |
| 4,426,477 A | 1/1984 | Yasumatsu et al. | |
| 4,556,694 A | 12/1985 | Wallace | |
| 4,605,694 A | 8/1986 | Walker | |
| 4,612,192 A | 9/1986 | Scheuffgen et al. | |
| 4,613,533 A | 9/1986 | Loomis et al. | |
| 4,627,993 A | 12/1986 | Loomis | |
| 4,670,494 A | 6/1987 | Semenza, Jr. | |
| 4,857,600 A | 8/1989 | Gross et al. | |
| 5,030,671 A * | 7/1991 | Wehner | C07C 323/62 524/101 |
| 5,225,108 A | 7/1993 | Bae et al. | |
| 5,227,417 A | 7/1993 | Kroushl, III | |
| 5,246,783 A | 9/1993 | Spenadel et al. | |
| 5,270,366 A | 12/1993 | Hein | |
| 5,278,236 A | 1/1994 | Case et al. | |
| 5,430,108 A | 7/1995 | Schlosberg et al. | |
| 5,454,806 A | 10/1995 | Shinonome | |
| 5,464,903 A | 11/1995 | Hofmann | |
| 5,466,267 A | 11/1995 | Baillargeon et al. | |
| 5,575,965 A | 11/1996 | Caronia et al. | |
| 5,736,605 A | 4/1998 | Oshima | |
| 5,756,570 A | 5/1998 | Hoch et al. | |
| 5,886,072 A | 3/1999 | Linsky et al. | |
| 6,063,846 A | 5/2000 | Weng et al. | |

(Continued)

FOREIGN PATENT DOCUMENTS

| CA | 1188445 A1 | 6/1985 |
|---|---|---|
| CN | 1341681 A | 3/2002 |

(Continued)

OTHER PUBLICATIONS

PCT/IN2012/000745, International Preliminary Report on Patentability, Issued May 12, 2015.
PCT/US2013/039841, International Search Report and Written Opinion, Mailed Mar. 27, 2014.
PCT/US2013/039841, International Preliminary Report on Patentability, Issued Dec. 21, 2014.
PCT/IN2012/00688, International Search Report and Written Opinion, Mailed Jun. 18, 2013.
PCT/IN2012/00688, International Preliminary Report on Patentability, Issued Apr. 30, 2015.
PCT/IN2012/000746 International Search Report and Written Opinion, Mailed May 31, 2013.
PCT/IN2012/000746, International Preliminary Report on Patentability, Issued May 12, 2015.

(Continued)

Primary Examiner — William H Mayo, III

(57) ABSTRACT

Plasticizers having an acetylated polyol hydroxystearate and plasticized polymeric compositions containing such plasticizers. Such plasticized polymeric compositions can be employed in forming various articles of manufacture, such as coated conductors.

10 Claims, No Drawings

(56) References Cited

U.S. PATENT DOCUMENTS

| | | | |
|---|---|---|---|
| 6,114,425 A | 9/2000 | Day et al. | |
| 6,274,750 B1 | 8/2001 | Sato et al. | |
| 6,417,260 B1 | 7/2002 | Weng et al. | |
| 6,437,170 B1 | 8/2002 | Thil et al. | |
| 6,451,958 B1 | 9/2002 | Fan et al. | |
| 6,495,033 B1 | 12/2002 | Talboom | |
| 6,496,629 B2 | 12/2002 | Ma et al. | |
| 6,608,142 B1 | 8/2003 | Weng et al. | |
| 6,706,815 B2 | 3/2004 | Marchand et al. | |
| 6,714,707 B2 | 3/2004 | Rossi et al. | |
| 6,734,241 B1 | 5/2004 | Nielsen et al. | |
| 6,797,753 B2 | 9/2004 | Benecke et al. | |
| 6,849,694 B2 | 2/2005 | Hata | |
| 6,949,597 B2 | 9/2005 | Nielsen et al. | |
| 7,700,675 B2 | 4/2010 | Bueno de Almeida et al. | |
| 2002/0013396 A1 | 1/2002 | Benecke et al. | |
| 2003/0186823 A1* | 10/2003 | Hoelderich | C07C 59/305 508/452 |
| 2004/0122159 A1 | 6/2004 | Mhetar et al. | |
| 2005/0090590 A1 | 4/2005 | Nielsen et al. | |
| 2005/0203230 A1 | 9/2005 | Kadakia et al. | |
| 2006/0025544 A1 | 2/2006 | Koube et al. | |
| 2006/0276575 A1 | 12/2006 | Hamaguchi et al. | |
| 2007/0100049 A1 | 5/2007 | Ishizuka | |
| 2007/0135562 A1 | 6/2007 | Freese et al. | |
| 2008/0200595 A1 | 8/2008 | Hinault et al. | |
| 2008/0227993 A1 | 9/2008 | Zuckerman | |
| 2009/0149585 A1 | 6/2009 | De Quadros Junior et al. | |
| 2009/0149586 A1 | 6/2009 | De Quadros Junior et al. | |
| 2009/0312478 A1 | 12/2009 | Hasegawa et al. | |
| 2010/0010127 A1 | 1/2010 | Barki et al. | |
| 2010/0076135 A1* | 3/2010 | Nielsen | C11C 1/10 524/313 |
| 2010/0256278 A1 | 10/2010 | Harada et al. | |
| 2011/0076502 A1 | 3/2011 | Chaudhary et al. | |
| 2011/0272174 A1 | 11/2011 | Chaudhary | |
| 2013/0005937 A1 | 1/2013 | Cramail et al. | |

FOREIGN PATENT DOCUMENTS

| | | | |
|---|---|---|---|
| CN | 101070510 A | 11/2007 | |
| CN | 101108982 A | 1/2008 | |
| CN | 101591588 A | 12/2009 | |
| CN | 101824193 A | 9/2010 | |
| CN | 101914219 A | 12/2010 | |
| EP | 0192961 A1 | 9/1986 | |
| EP | 0358179 A2 | 3/1990 | |
| EP | 0364717 A1 | 4/1990 | |
| EP | 0 393 813 A1 | 10/1990 | |
| EP | 0473915 A1 | 3/1992 | |
| EP | 0565984 A1 | 10/1993 | |
| EP | 0986606 A1 | 3/2000 | |
| EP | 1218443 A1 | 7/2002 | |
| EP | 1361039 A1 | 11/2003 | |
| EP | 1624014 A1 | 2/2006 | |
| EP | 2070977 A2 | 6/2009 | |
| EP | 2245089 A1 | 11/2010 | |
| FR | 1437722 A | 5/1966 | |
| GB | 102292 A | 11/1916 | |
| GB | 499931 A | 1/1939 | |
| GB | 790314 A | 2/1958 | |
| GB | 910543 A | 11/1962 | |
| GB | 934689 A | 8/1963 | |
| GB | 1102506 A | 2/1968 | |
| GB | 1341623 A | 12/1973 | |
| GB | 2155021 A | 9/1985 | |
| JP | S44-007131 | 3/1969 | |
| JP | S61-016950 | 1/1986 | |
| JP | 04-059851 B2 | 2/1992 | |
| JP | H04-085354 | 3/1992 | |
| JP | H04-261452 A | 9/1992 | |
| JP | 2000-319468 A | 11/2000 | |
| JP | 2003-064233 A | 3/2003 | |
| JP | 2003-297149 A | 10/2003 | |
| JP | 2004311064 A | 11/2004 | |
| JP | 2010-042669 A | 2/2010 | |
| WO | 9730115 A1 | 8/1997 | |
| WO | 0114466 A1 | 3/2001 | |
| WO | 0198404 A2 | 12/2001 | |
| WO | 2004052977 A1 | 6/2004 | |
| WO | 2007006489 A1 | 1/2007 | |
| WO | 2008081330 A1 | 7/2008 | |
| WO | 2008081332 A1 | 7/2008 | |
| WO | 2008122364 A1 | 10/2008 | |
| WO | 2009102877 A1 | 8/2009 | |
| WO | 2011/041380 A1 | 4/2011 | |
| WO | 2011/041388 A1 | 4/2011 | |
| WO | 2011041372 A1 | 4/2011 | |
| WO | WO2011/041363 A1 * | 4/2011 | ............... H01B 3/44 |
| WO | WO2011041388 A1 * | 4/2011 | ............... H01B 3/44 |
| WO | 2013003225 A2 | 1/2013 | |

OTHER PUBLICATIONS

PCT/US2013/039840 International Search Report and Written Opinion, Mailed Jul. 11, 2013.
PCT/US2013/039840, International Preliminary Report on Patentability, Issued Dec. 31, 2014.
PCT/US2014/020556 International Search Report and Written Opinion, Mailed Jun. 25, 2014.
PCT/US2010/050654, International Preliminary Report on Patentability, Issued Mar. 31, 2012.
PCT/US2010/050676, International Preliminary Report on Patentability, Issued Mar. 31, 2012.
PCT/US2011/045653, International Preliminary Report on Patentability, Issued Jan. 28, 2013.
PCT/US2012/043740, International Preliminary Report on Patentability, Issued Jan. 7, 2014.
PCT/US2012/055070, International Preliminary Report on Patentability, Issued Apr. 1, 2014.
PCT/US2010/050669, International Preliminary Report on Patentability, Issued Apr. 11, 2012.
PCT/US2011/035143, International Preliminary Report on Patentability, Issued Nov. 10, 2012.
Barnicoat, C.R. 1945. Reactions and properties of annatto as a cheese colour. Part II. J. Dairy Res. 14: 59-63.
Bizzari, S.N. et al (2003), Plasticizers. CEH Marketing Research Report, 38-64, Retrieved from http://www.sriconsulting.com.
Campanella A. et al.; High Yield Epoxidation of Fatty Acid Methyl Esters with Performic Acid Generated In Situ; Chemical Engineering Journal, 144 (2008) 466-475 (Elsevier B.V.).
Chuanshang Cai, et al.; Studies on the Kinetics of In Situ Epoxidation of Vegetable Oils; Eur. J. Lipid Sci. Technol., 2008, 110, 341-346 (Wiley-VCH GmbH & Co. KGaA, Weinheim).
Corrigan, Brian Oil purification, filtration and reclamation, Iron Age (1947) 159(14).
Danisco, Grindsted Soft-n-Safe brochure (date unknown).
Du G., et al., Catalytic Epoxidation of Methyl Linoleate, JAOCS, vol. 81, No. 4 (2004).
Freedman, F., Butterfield, R., and Pryde, E.H. Transesterification Kinetics of Soybean Oil. JAOCS, 63(10) p. 1375 (1986).
Gan, L. H., et al (1994) Epozidized esters of palm olein as plasticizers for poly (vinyl chloride). European Polymer Journal, 31(8), 719-724.
Greenspan, F. P. et al (1953) Epoxy fatty acid ester plasticizers. Indstrial and Engineering Chemistry, 445(12), 2722-2726.
Greenspan, F.P. et al (1956), Epoxy fatty acid ester plasticizers. Preparartion and properties, The Journal of the American Oil Chemists Society, 33, 391-394.
Grummitt O. and Fleming H. Acetylated Castor Oil Industrial and Engineering Chemistry, vol. 37, No. 5, May 1945, pp. 485-491.
Haas, Michael J. Improving the Economics of biodiesel production through the use of low value lipids as feedstocks: vegetable oil soapstock, Fuel Processing Technology 86 p. 1087-96 (2005).
Jensen, R.G. Purification of Triglycerides with an Aluminca Column, Lipids, 451-452 (1966).
Morgenstern, B. "Epoxidized Fatty Acid Esters as Plasticizers for PVC" dated Apr. 22, 2005.

(56) References Cited

OTHER PUBLICATIONS

Morgenstern, B. Epoxidized Fatty Acid Esters as Plasticizers for PVC, presented at the 7th Freiberg Polymer Conference, Apr. 21 and 22, 2005.
Morgenstern, B. Use of Modified Fatty Acid Esters as Plasticizers for PVC, dated Sep. 12, 2003.
Opposition to patent EP2245089, Dated Jan. 9, 2013.
Orellana-Coca et al., Lipase Mediated Simultaneious Esterification and Epoxidation of Oleic Acid for the Production of Alkylepoxystearates. Journal of Molecular Catalysis B: Enzymatic 44 (2007) 133-137.
Stuart, A et al., Polym. Bull. (2010) 65:589-598.
Rehberg, C. et. al. Plasticizers from Lactic Esters and Biabasic Acids Ind. Eng. Chem., 1952, 44 (9), pp. 2191-2195.
Santacesaria E. et al.; A Biphasic Model Describing Soybean Oil Epoxidation with H2O2 in a Fed-Batch Reactor; Chemical Engineering Journal, vol. 173, Issue 1, Sep. 1, 2011, pp. 198-209 (Elsevier B.V.).
Senžana S. et al.; Kinetics of In Situ Epoxidation of Soybean Oil in Bulk Catalyzed by Ion Exchange Resin; Journal of the American Oil Chemists' Society, vol. 78, No. 7 (2001) 725-731 (AOCS Press).
Sheehan, J et al. "A Look Back at the U.S. Department of Energy's Aquatic Species Program: Biodiesel from Algae", National Renewable Energy Laboratory, Colorado, Jul. 1998, pp. 1-294.
Taylor, D. R. Proceedings of the World Conference on oilseed technology and utilization, Adsorptive Purification, American Oil Chemists Society, Champaing, 1992, p. 152-165.
Tekin A., and Hammond E. Factors Affecting the Electrical Resistivity of Soybean Oil, JAOCS, vol. 75(6) 1998.
XP002657062 Vertellus Performance Materials Inc.; Flexricin P-8 Technical Data Sheet, Nov. 2006.
XP002669860, Thomson Scientific, Mar. 13, 2009, London, GB.
TCI America, Online Catalog: Tributyrin; http://web.archive.org/web/20080511154307/http://www.tciamerica.com/.
PCT/ US2009/033935, International Preliminary Report on Patentability, Mailed Aug. 26, 2010.
PCT/US2009/033935 International Search Report and Written Opinion, Mailed Mailed May 18, 2009.
PCT/US2010/050654 International Search Report and Written Opinion Mailed Nov. 9 2010.
PCT/US2010/050676 International Search Report and Written Opinion Mailed Jan. 12, 2011.
PCT/US2010/050690 International Preliminary Report on Patentability, Mailed Jan. 12, 2012.
PCT/US2010/050690 International Search Report and Written Opinion, Mailed Aug. 2, 2011.
PCT/US2010/050699 International Search Report and Written Opinion, Mailed Nov. 8, 2010.
PCT/US2011/035143 International Search Report and Written Opinion, Mailed Aug. 26, 2011.
PCT/US2011/041557 International Preliminary Report on Patentability, Mailed Aug. 31, 2012.
PCT/US2011/041557 International Search Report and Written Opinion Mailed Sep. 5, 2011.
PCT/US2011/045653 International Search Report and Written Opinion, Mailed Oct. 7, 2011.
PCT/US2012/043740 International Search Report and Written Opinion, Mailed Jan. 23, 2013.
PCT/US2012/055070 International Search Report and Written Opinion, Mailed Dec. 3, 2012.
PCT/US2013/023362 International Search Report and Written Opinion, Mailed Mar. 28, 2013.
PCT/US2013/023362, International Preliminary Report on Patentability, Issued Aug. 12, 2014.
PCT/US2011/059166 International Search Report and Written Opinion, Mailed Feb. 29, 2012.
PCT/US2011/059166, International Preliminary Report on Patentability, Issued May 7, 2013.
PCT/IN2012/000745 International Search Report and Written Opinion, Mailed Aug. 29, 2013.

\* cited by examiner

ACETYLATED POLYOL HYDROXYSTEARATE PLASTICIZERS AND PLASTICIZED POLYMERIC COMPOSITIONS

REFERENCE TO RELATED APPLICATIONS

The present application claims the benefit of U.S. Provisional Application No. 61/663,261, filed on Jun. 22, 2012.

FIELD

Various embodiments of the present invention relate to acetylated polyol hydroxystearate plasticizers and plasticized polymeric compositions.

INTRODUCTION

Plasticizers are compounds or mixtures of compounds that, when added to a polymer resin, can lower the modulus and tensile strength, and increase flexibility, elongation, impact strength, and tear strength of the resin (typically a thermoplastic polymer) to which they are added. A plasticizer may also lower the glass transition temperature of the polymer resin, which enhances processability of the polymer resin.

Phthalic acid diesters (also known as "phthalates") are commonly used as plasticizers in many flexible polymer products, such as polymer products formed from polyvinyl chloride ("PVC") and other vinyl polymers. Examples of phthalate plasticizers include diisononyl phthalate, diallyl phthalate, di-2-ethylhexyl-phthalate, dioctyl phthalate, and diisodecyl phthalate.

Phthalate plasticizers have recently come under intense scrutiny by public interest groups concerned about the negative environmental impact of phthalates and potential adverse health effects in humans exposed to phthalates. Accordingly, suitable replacements for phthalate plasticizers are desired.

SUMMARY

One embodiment is a polymeric composition comprising:
(a) a vinyl chloride resin; and
(b) a plasticizer comprising an acetylated polyol hydroxystearate,
wherein said acetylated polyol hydroxystearate comprises acetylated polyol monohydroxystearate in an amount of at least 70 weight percent, based on the entire weight of the acetylated polyol hydroxystearate.

DETAILED DESCRIPTION

Various embodiments of the present invention concern plasticizers comprising an acetylated polyol hydroxystearate. The plasticizers may additionally include an epoxidized natural oil, an epoxidized fatty acid alkyl ester, or both. Such plasticizers can be incorporated with a polymeric resin to form plasticized polymeric compositions, which can in turn be employed in various articles of manufacture.

Plasticizer

The present disclosure provides a plasticizer comprising an acetylated polyol hydroxystearate. As used herein, the term "polyol hydroxystearate" denotes an ester of a polyol and a hydroxystearic acid. The term "polyol" denotes an alcohol having at least two hydroxyl groups, such as a diol or triol. An "acetylated" polyol hydroxystearate is a polyol hydroxystearate that has been subjected to acetylation to convert at least a portion of hydroxyl groups on the polyol hydroxystearate to acetyl groups.

The hydroxystearic acid precursor of the polyol hydroxystearate can be any hydroxystearic acid known in the art. In various embodiments, the hydroxystearic acid can primarily comprise monohydroxystearic acid (i.e., a stearic acid containing a single hydroxyl group on its fatty acid chain). In an embodiment, the monohydroxystearic acid can be 12-hydroxystearic acid. In various embodiments, the hydroxystearic acid can comprise monohydroxystearic acid in an amount of at least 70, at least 80, at least 90, at least 95, or at least 99 weight percent based on the entire weight of the hydroxystearic acid. Consequently, in various embodiments, the acetylated polyol hydroxystearate can comprise acetylated polyol monohydroxystearate in an amount of at least 70, at least 80, at least 90, at least 95, or at least 99 weight percent based on the entire weight of the acetylated polyol hydroxystearate.

Polyols suitable for use in the acetylated polyol hydroxystearate include alkylene glycols, triethylene glycol, trimethylolethane, trimethylolpropane, pentaerythritol, mannitol, sorbitol, and mixtures of two or more thereof. In various embodiments, the polyol is an alkylene glycol. As used herein, the term "alkylene" denotes a divalent group formed by removing two hydrogen atoms from a hydrocarbon, the free valencies of which are not engaged in a double bond. In an alkylene glycol, the free valencies of the alkylene group are both occupied by hydroxyl groups. Suitable alkylene glycols include ethylene glycol, propylene glycol, 1,3-butanediol, 1,4-butanediol, 2-ethyl-1,3-hexanediol, 2-methyl-2-propyl-1,3-propanediol, and mixtures of two or more thereof. In an embodiment, the polyol is propylene glycol. In an embodiment, the polyol is not glycerol.

The polyol hydroxystearate can be prepared via any conventional or hereafter discovered methods for esterifying an alcohol and a carboxylic acid. In an embodiment, reaction conditions can be controlled such that only one hydroxyl group of the polyol is esterified. Such control can be accomplished according to methods known to those of ordinary skill in the art, such as by controlling the ratio of reactants, or by employing reactants having varying reactivity (e.g., varying conditions based on the fact that primary hydroxyl groups are generally more reactive than secondary hydroxyl groups). In various embodiments, the polyol is combined with the hydroxystearic acid to perform the esterification. The esterification may be catalyzed with a catalyst, such as an organometallic catalyst (e.g., tin octoate). The reaction mixture can be heated (e.g., to 140° C.), while removing water formed by the reaction using a nitrogen stream. Alternatively, commercially available polyol hydroxystearates may be employed. An example of a commercially available polyol hydroxystearate is PARACIN™ 9, CAS number 38621-51-1, available from Vertellus Specialties, Inc., which is a propylene glycol monohydroxystearate (≥90% purity).

Acetylation can be performed by contacting the polyol hydroxystearate with an acetylating reagent, such as acetic anhydride, acetic acid, or acetyl chloride, according to known techniques. In an embodiment, the acetylating reagent is acetic anhydride. Acetylation can be performed at elevated temperatures (e.g., 115° C.) over a period of time (e.g., 4 hours). Additionally, acetylation can be followed by the application of vacuum (e.g., 150-800 mbar (15-80 kPa)) to remove residual acetylating reagent and byproduct (e.g., acetic acid when the acetylating reagent is acetic anhydride). The amount of acetylating reagent used depends on the hydroxyl number of the starting material and that targeted in the final acetylated product. In an embodiment, the acetylating reagent can be used in at least equimolar ratios with the amount of hydroxyl groups of the polyol hydroxystearate. For instance, when a diol is employed as the polyol in preparing the polyol hydroxystearate, the resulting compound has two hydroxyl groups (one located on the fatty acid chain and one located on the diol moiety). In such a case, the acetylating reagent can be employed in at least a 2:1 molar ratio to the polyol hydroxystearate, resulting in at least an equimolar ratio of acetylating reagent to hydroxyl group. Accordingly, hydroxyl groups converted to acetyl groups as a result of acetylation can be located both on the fatty acid chain of the stearate as well as non-esterified hydroxyl groups of the polyol. In an embodiment, an excess of acetylating reagent can be employed for complete acetylation (i.e., to achieve a target hydroxyl number of zero).

In an embodiment, the plasticizer can further comprise an epoxidized natural oil ("eNO"). A "natural oil," as used herein, is an oil composed of fatty acid triglycerides and derived from a microbe (algae, bacteria), a plant/vegetable, and/or a seed. In an embodiment, natural oils include genetically-modified natural oils. In various embodiments, the natural oil excludes petroleum-derived oil. Non-limiting examples of suitable natural oils include beef tallow oil, canola oil, castor oil, corn oil, fish oil, linseed oil, palm oil, rapeseed oil, safflower oil, soybean oil, sunflower oil, tall oil, tung oil, and any combination of two or more thereof.

The term "epoxidized natural oil," as used herein, is a natural oil having at least one fatty acid moiety that contains at least one epoxide group. Epoxidation may be performed via conventional methods, typically by way of reaction of the natural oil with a peroxide, a percarboxylic acid, and/or other peroxy compounds, often in the presence of an acid or base catalyst.

Non-limiting examples of suitable eNOs include epoxidized algae oil, epoxidized beef tallow oil, epoxidized canola oil, epoxidized castor oil, epoxidized corn oil, epoxidized fish oil, epoxidized linseed oil, epoxidized palm oil, epoxidized rapeseed oil, epoxidized safflower oil, epoxidized soybean oil, epoxidized sunflower oil, epoxidized tall oil, epoxidized tung oil, and any combination of two or more thereof.

In an embodiment, the epoxidized natural oil is an epoxidized soybean oil ("eSO").

Examples of suitable commercially available epoxidized natural oils include PLAS-CHEK™ epoxidized soybean oil, available from Ferro Corp., Mayfield Heights, Ohio, USA; VIKOFLEX™ 7170 epoxidized soybean oil and VIKOFLEX™ 7190 epoxidized linseed oil, both available from Arkema Inc., Philadelphia, Pa., USA.

In an embodiment, the present plasticizer can also include an epoxidized fatty acid alkyl ester ("eFAAE"), such as epoxidized fatty acid methyl esters. eFAAEs can be prepared via esterification of epoxidized natural oils, such as those described above, using conventional techniques. eFAAEs can also be prepared by first esterifying a natural oil, followed by epoxidation, using conventional techniques. Alternatively, commercially available eFAAEs may be employed. Examples of commercially available eFAAEs are VIKOFLEX™ 7010, VIKOFLEX™ 7040, VIKOFLEX™ 7080, VIKOFLEX™ 9010, VIKOFLEX™ 9040, and VIKOFLEX™ 9080, available from Arkema Inc., Philadelphia, Pa., USA.

In various embodiments, the acetylated polyol hydroxystearate constitutes the entirety of the plasticizer. In other embodiments, when more than one component is present in the plasticizer, the plasticizer can comprise the acetylated polyol hydroxystearate in an amount ranging from 20 to 80 weight percent (wt %), 30 to 70 wt %, 40 to 60 wt %, or 50 wt % based on the entire weight of the plasticizer, with the remainder being eNO, eFAAE, or a combination thereof. In various embodiments, the plasticizer is a 50:50 blend by weight of acetylated polyol hydroxystearate and eNO (e.g., eSO). In various embodiments, the plasticizer is free or substantially free of phthalates.

Polymeric Composition

The present disclosure provides a polymeric composition comprising a polymeric resin and the above-described plasticizer. In various embodiments, the polymeric composition is free or substantially free of phthalates.

Non-limiting examples of suitable polymeric resins include polysulfides, polyurethanes, acrylics, epichlorohydrins, nitrile rubber, chlorosulfonated polyethylene, chlorinated polyethylene, polychloroprene, styrene butadiene rubber, natural rubber, synthetic rubber, ethylene-propylene-diene monomer rubber, propylene-based polymers, ethylene-based polymers, and vinyl chloride resins. The term "propylene-based polymer" denotes a polymer comprising a majority weight percent polymerized propylene monomer (based on the total amount of polymerizable monomers) and optionally at least one polymerized comonomer. The term "ethylene-based polymer" denotes a polymer comprising a majority weight percent polymerized ethylene monomer (based on the total weight of polymerizable monomers) and optionally at least one polymerized comonomer.

The term "vinyl chloride resin" denotes a vinyl chloride polymer, such as polyvinyl chloride ("PVC"), or a vinyl chloride copolymer, such as vinyl chloride/vinyl acetate copolymer, vinyl chloride/vinylidene chloride copolymer, vinyl chloride/ethylene copolymer, or a copolymer prepared by grafting vinyl chloride onto ethylene/vinyl acetate copolymer. The vinyl chloride resin can also include a polymer blend of the above-mentioned vinyl chloride polymer or vinyl chloride copolymer with other miscible or compatible polymers including, but not limited to, chlorinated polyethylene, thermoplastic polyurethane, olefin polymers such as a methacryl polymer, or acrylonitrile-butadiene-styrene polymer.

In an embodiment, the vinyl chloride resin is PVC.

In an embodiment, the polymeric composition comprises the polymeric resin in an amount ranging from 20 to 90 wt %, from 30 to 85 wt %, or from 40 to 80 wt %, based on the entire polymeric composition weight. In various embodiments, the polymeric composition comprises the above-described plasticizer in an amount ranging from 10 to 80 wt %, from 15 to 70 wt %, or from 20 to 60 wt %, based on the entire polymeric composition weight.

In various embodiments, the polymeric resin (such as PVC) has a solution temperature in the above-described plasticizer of less than 180° C., less than 170° C., or less than 160° C., as determined by Deutsches Institut für Normung ("DIN") standard method 53 408. In certain embodiments, the polymeric resin can have a solution temperature in the above-described plasticizer in the range of from 100 to 180° C., in the range of from 120 to 170° C., in the range of from 140 to 160° C., or in the range of from 150 to 160° C., determined according to DIN 53 408.

In various embodiments, the polymeric composition has a Shore D hardness of less than 34, less than 33, or less than 32, as determined by American Society for Testing and Materials ("ASTM") standard D2240. In such embodiments, the polymeric composition can have a minimum Shore D hardness of 23. In other embodiments, the polymeric composition has a Shore A hardness of less than 90, less than 89, less than 88, less than 87, less than 86, or less than 85, as determined by ASTM D2240. In such embodiments, the polymeric composition can have a minimum Shore A hardness of 80. Shore hardness (both A and D) is determined on polymeric compositions having a plasticizer loading of 50 parts per hundred resin ("phr") based on 100 parts by weight of the polymeric resin.

In various embodiments, the polymeric composition has a tensile elongation retention ("TER") of at least 30, at least 40, at least 50, at least 60, or at least 70% after heat aging at 113° C. or 136° C. for 168 hours, as determined by ASTM D638. In such embodiments, the polymeric composition can have a TER up to 100% after heat aging at 113° C. or 136° C. for 168 hours, as determined by ASTM D638. Heat-aging of polymeric compositions is performed according to the procedure described below in the following Test Methods section. TER can be determined on polymeric compositions having a plasticizer loading of 50 phr.

In various embodiments, the polymeric composition has a tensile strength retention ("TSR") of at least 100, at least 110, at least 115, at least 120, or at least 125% after heat aging at 113° C. or 136° C. for 168 hours, as determined by ASTM D638. In such embodiments, the polymeric composition can have a TSR up to 140, 150, or 200% after heat aging at 113° C. or 136° C., as determined by ASTM D638. TSR can be determined on polymeric compositions having a plasticizer loading of 50 phr.

In various embodiments, the polymeric composition has a weight retention of at least 75, at least 80, at least 85, or at least 90% after heat aging at 113° C. or 136° C. for 168 hours. Weight retention can be determined on polymeric compositions having a plasticizer loading of 50 phr.

Additives

The polymeric composition may include one or more of the following optional additives: a filler, a flame retardant, a heat stabilizer, an anti-drip agent, a colorant, a lubricant, a low molecular weight polyethylene, a hindered amine light stabilizer, a UV light absorber, a curing agent, a booster, a retardant, a processing aid, a coupling agent, an antistatic agent, a nucleating agent, a slip agent, a viscosity control agent, a tackifier, an anti-blocking agent, a surfactant, an extender oil, an acid scavenger, a metal deactivator, and any combination thereof.

In an embodiment, the polymeric composition comprises a heat stabilizer. Examples of suitable heat stabilizers include lead-free metal soaps, lead stabilizers, organic heat stabilizers, epoxides, salts of monocarboxylic acids, phenolic antioxidants, organic phosphites, and beta-diketones. In an embodiment, the heat stabilizer employed is a lead-free mixed metal soap. The term "metal soap" denotes a salt of an acid with a metal. Metal soaps suitable for use include zinc salts of fatty acids (e.g., zinc stearate), calcium salts of fatty acids, barium salts of fatty acids, magnesium salts of fatty acids, tin salts of fatty acids, and mixtures of two or more thereof. Heat stabilizers can be present in the polymeric composition in an amount ranging from 0.2 to 10 wt %, from 0.4 to 7 wt %, or from 0.6 to 5 wt %, based on the entire polymeric composition weight.

In an embodiment, the polymeric composition includes PVC, the present plasticizer, a filler (e.g., calcium carbonate, clays, silica, and any combination thereof), one or more metal soap stabilizers, a phenolic or related antioxidant, and a processing aid.

Coated Conductor

The present disclosure provides a coated conductor. The coated conductor includes a conductor and a coating on the conductor, the coating being at least partially being formed from the polymeric composition described above.

A "conductor," as used herein, is one or more wire(s) or fiber(s) for conducting heat, light, and/or electricity. The conductor may be a single-wire/fiber or a multi-wire/fiber and may be in strand form or in tubular form. "Wire" means a single strand of conductive metal or a single strand of optical fiber. Non-limiting examples of suitable conductors include metals such as silver, gold, copper, carbon, and aluminum. The conductor may also be optical fiber made from either glass or plastic.

The coated conductor may be flexible, semi-rigid, or rigid. The coating (also referred to as a "jacket," "sheath," or "insulation") can be located either directly on the conductor or on another layer that surrounds the conductor.

In an embodiment, the coated conductor is a cable. "Cable" and "power cable" mean at least one wire or optical fiber within a sheath. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

In an embodiment, the cable is a 60° C., 75° C., 80° C., 90° C., or 105° C.-rated cable according to Underwriters Laboratories ("UL") standards 83 and 1581 under dry conditions.

Test Methods

Shore Hardness

Determine Shore (A and D) hardness according to ASTM D2240 using molded specimens of 250 mil (6.35 mm) thickness.

Tensile Properties

Determine tensile strength, tensile elongation, and secant modulus for both unaged and heat-aged samples according to ASTM D638 at a displacement rate of 2 inch/minute on Type IV dog bone-shaped specimens cut from 30-mil (0.762 mm) thick molded plaques.

Volume Resistivity

Determine volume resistivity ("VR") (ohm·cm at 23° C.) with 500 volts direct current in accordance with ASTM D257. Employ 3.5-inch diameter specimens cut from 40-mil (1.016 mm) thick molded plaques and a Hewlett Packard 16008A Resistivity Cell connected to a Hewlett Packard 4329A High Resistance Meter.

Loop Spew (Plasticizer Compatibility)

Measure loop spew in accordance with ASTM D3291.

Weight Retention

Measure weight retained, expressed as a percentage, after various days at elevated temperatures on specimens of 1.25 inch (3.715 cm) diameter that are cut from 30-mil (0.762 mm) thick molded plaques.

Heat Aging

Heat aging of the "tensile" and "weight retained" specimens (having geometries described above) is conducted using Type II ASTM D5423-93 Testing Mechanical Convection Oven.

Acid Number

Determine acid number according to DIN 53 402.

Hydroxyl Number

Determine hydroxyl number according to DIN 53 240.

Solution Temperature

Solution Temperature is the temperature at which a heterogeneous mixture of plasticizer and a PVC resin is observed to change to a single phase. Solution temperature is determined by immersing 1 gram PVC in 20 grams of plasticizer and increasing the temperature stepwise until the PVC is observed to be completely dissolved, in accordance with DIN 53 408.

Water Percent

Determine water percent according to DIN 51 777.

Viscosity

Determine viscosity according to ASTM D445, using a Brookfield viscometer.

Density

Determine density according to DIN 51 757.

Temperature of 5% Mass Loss

Temperature of 5% mass loss (° C.) is determined using TG/DTA 220. The plasticizer specimen is heated from room temperature up to 600° C. at 10 K/min under inert gas purge, and the appearing mass loss and thermal effects are recorded in thermograms. The higher the temperature for 5% mass loss, the lower the volatility.

EXAMPLES

Example 1

Plasticizer Preparation and Comparative Plasticizer Preparation

Sample 1

Prepare Sample 1 ("S1"), which is acetylated propylene glycol hydroxystearate, starting with a commercially available propylene glycol hydroxystearate, PARACIN™ 9 from Vertellus Specialties, Inc., which comprises 90-100 wt % propylene glycol monohydroxystearate and has a hydroxyl number of 285 mg KOH/g. Charge 150 g (0.42 mol hypothetically) of the propylene glycol monohydroxystearate and 86 g (0.84 mol) of acetic anhydride (Merck, purity ≥98.5 wt %) to a 500-mL flask. Fix the flask, which is equipped with distillation glassware and a mechanical stirrer, in a heated oil bath having a temperature of 115° C. Maintain the temperature at 115° C. over 4 hours. Following the reaction, remove byproduct acetic acid and residual acetic anhydride by employing a vacuum from 800 to 150 mbar (80-15 kPa). A yellow liquid is obtained.

Sample 2

Prepare Sample 2 ("S2") using the same procedure as in Sample 1, except employ 90 g (0.88 mol) of acetic anhydride.

Comparative Sample 1

Prepare Comparative Sample 1 ("CS1") by charging 77.7 g (0.258 mol) of 12-hydroxystearic acid (Fluka, assay >70 wt %), 20 g (0.263 mol) of propylene glycol (Fluka, assay >98 wt %), and 0.1 g of catalyst Tin (II) octoate (Sigma-Aldrich, ~95 wt %) to a 250-mL 3-neck flask. Fix the flask, which is equipped with distillation glassware and a mechanical stirrer, in a heated oil bath having a temperature of 140° C. Throughout the reaction, remove water formed during the reaction using a nitrogen stream. Follow the reaction progress by periodically measuring the amount of removed water and determining the acid number. Stop the reaction at an acid number of 4.9 mg KOH/g.

Add 54 g (0.53 mol) acetic anhydride (Merck, purity ≥98.5 wt %) to 85 g (0.24 mol, hypothetically) of the product (propylene glycol hydroxystearate), and heat the mixture in a heated oil bath at 115° C., and maintain the temperature for 4 hours. Remove byproduct acetic acid and residual acetic anhydride by employing a vacuum from 800 to 150 mbar (80-15 kPa). A liquid product is obtained.

Comparative Sample 2

Comparative Sample 2 ("CS2") is a non-phthalate, commercially available plasticizer named GRINDSTED™ Soft-n-Safe, available from Danisco A/S (Copenhagen, DK). CS2 is an acetylated monoglyceride of hydrogenated castor oil.

Comparative Sample 3

Comparative Sample 3 ("CS3") is a commercially available epoxidized soybean oil named PLAS-CHEK™ 775, available from Ferro Corp. (Mayfield Heights, Ohio, USA).

Comparative Sample 4

Comparative Sample 4 ("CS4") is trioctyl trimellitate (a.k.a., tris(2-ethylhexyl) trimellitate), available from Sigma-Aldrich, St. Louis, Mo., USA).

Properties

Analyze the plasticizers according to the test methods provided above. Table 1, below, provides the properties of Samples 1 and 2, and Comparative samples 1-4.

TABLE 1

| Plasticizer Properties | | | | | | |
|---|---|---|---|---|---|---|
| | S1 | S2 | CS1 | CS2 | CS3 | CS4 |
| Physical Form | Liquid | Liquid | Liquid | Liquid | Liquid | Liquid |
| Acid Number [mg KOH/g] | 4 | 2.7 | 2.5 | 1.5 | N/A | N/A |
| Hydroxyl Number [mg KOH/g] | 7 | 0 | 0 | 0 | N/A | N/A |
| Solution Temp. in PVC (° C.) | 158 | 155 | 190 | 151 | 144 | 145 |
| Temperature of 5% mass loss (TG/TGA) [° C.] | 263 | 261 | 268 | 266 | N/A | N/A |
| Water [%] (DIN 51 777) | 0.017 | 0.012 | 0.011 | 0.031 | 0.099 | 0.059 |
| Viscosity at 25° C. (mPas) | 100 | 75 | N/A | 100 | 400 | 194 |
| Viscosity at 40° C. (mPas) | 30 | 25 | N/A | 45 | N/A | N/A |
| Density at 25° C. (g/cm$^3$) | 0.957 | 0.958 | 0.94 | 0.999 | 0.994 | 0.989 |

N/A = Not Available

The solution temperatures of Samples 1 and 2 are close to those of known PVC plasticizers (Comparative Samples 2-4), indicating that these two plasticizers are sufficiently compatible with PVC. In contrast, CS1 has an unacceptably high solution temperature, suggesting that this plasticizer is incompatible with PVC. Samples 1 and 2 also exhibit acceptably low viscosity and high temperature of 5% mass loss, to make them useful as plasticizers for PVC, particularly for high-temperature applications. Additionally, S2 achieves complete acetylation (indicated by 0 hydroxyl number), since a slight excess of acetic anhydride is employed. Lower hydroxyl number generally indicates improved solubility in PVC.

Example 2

Polymer Compositions with Blended Plasticizers

Employ the following procedure to prepare Samples 4 and 5 (S4 and S5) and Comparative Samples 5 and 6 (CS5 and CS6).

In the following examples, the PVC employed is OXYVINYLS™ 240F (Occidental Chemical Corporation, Dallas, Tex., USA), the filler is SATINTONE™ SP-33 Clay (BASF Corporation, Florham Park, N.J., USA), the heat stabilizer is BAEROPAN™ MC 90249 KA (Baerlocher USA, Dover, Ohio, USA), and the antioxidant is IRGANOX™ 1076 (BASF SE, Ludwigshafen, Del.). For plasticizer blends (S4, S5, and CS5), the eSO employed is PLAS-CHEK™ 775, available from Ferro Corp. (Mayfield Heights, Ohio, USA). If a blend of plasticizers is used, prepare the mixture by combining the components and shaking for a period of time (e.g., 5 minutes).

Prepare plasticized PVC samples according to the formulations provided in Table 2, below.

TABLE 2

Sample Compositions for S4-5 and CS5-6

|  | S4 | S5 | CS5 | CS6 |
|---|---|---|---|---|
| PVC (wt %) | 62.3 | 62.3 | 62.3 | 62.3 |
| Filler (wt %) | 6.4 | 6.4 | 6.4 | 6.4 |
| Heat Stabilizer (wt %) | 1.0 | 1.0 | 1.0 | 1.0 |
| Antioxidant (wt %) | 0.3 | 0.3 | 0.3 | 0.3 |
| 50:50 (wt/wt) S1:eSO (wt %) | 30.0 | — | — | — |
| 50:50 (wt/wt) S2:eSO (wt %) | — | 30.0 | — | — |
| 50:50 (wt/wt) CS1:eSO (wt %) | — | — | 30.0 | — |
| CS3 (wt %) | — | — | — | 30.0 |
| Total | 100 | 100 | 100 | 100 |
| Plasticizer parts per hundred resin (phr) | ~48 | ~48 | ~48 | ~48 |

Prepare the above samples by preheating the plasticizer (or plasticizer blend) to 60° C. for at least 60 minutes and shake by hand for a few seconds before use. After weighing the individual components, prepare "dry blends" by soaking the plasticizer composition into the PVC powder, and then prepare melt mixtures. Prepare "dry blends" as follows:

(a) Mix all ingredients (except plasticizer and filler) in a container using spatula.
(b) Warm up a 40 cm$^3$ Brabender mixing bowl with sigma blades at 90° C. and 40 rpm for two minutes.
(c) Add the mixed ingredients from step (a) to the mixing bowl and mix for 30 seconds.
(d) Add the plasticizer to the mixing bowl and mix for 6 minutes.
(e) Add filler and mix for 60 seconds.
(f) Stop and remove the dry blend.

Thereafter, melt mix the "dry blends" using the Brabender mixing bowl with cam rotors at 40 rpm setting and mixing at 180° C. for 2 minutes.

Compression mold the resulting blend compositions at 180° C. for 5 minutes (2 minutes at approximately 500 psi, followed by 3 minutes at approximately 2,000 psi). Employing the procedures described above, measure the properties of (1) unaged specimens, and (2) specimens aged at elevated temperatures. The heat aged specimens are also examined visually for evidence of exudate (spew) at the surface. Measure properties of the samples according to the procedures outlined above. The results are provided in Table 3, below.

TABLE 3

Properties of S4-5, and CS5-6

|  | S4 | S5 | CS5 | CS6 |
|---|---|---|---|---|
| Shore D Hardness | 32.5 ± 0.4 | 31.7 ± 0.1 | 40.5 ± 0.7 | 35.5 ± 0.2 |
| Shore A Hardness | 87.2 ± 0.1 | 86.3 ± 0.2 | 92.7 ± 0.5 | 88.6 ± 0.3 |
| TS, un-aged (psi) | 3337 ± 29 | 3004 ± 175 | 3808 ± 102 | 3378 ± 98 |
| TSR, after 113° C. aging (%) | 109 ± 4 | 119 ± 11 | 107 ± 1 | 107 ± 1 |
| TSR, after 136° C. aging (%) | 139 ± 11 | 138 ± 14 | 107 ± 5 | 111 ± 10 |
| TE, un-aged (psi) | 284 ± 9 | 286 ± 11 | 276 ± 2 | 271 ± 9 |
| TER, after 113° C. aging (%) | 92 ± 3 | 87 ± 6 | 99 ± 7 | 88 ± 8 |
| TER, after 136° C. aging (%) | 71 ± 7 | 64 ± 3 | 80 ± 4 | 87 ± 3 |
| WR, after 136° C. aging (%) | 90.6 | 89.7 | 94.8 | 99.9 |
| Exudate on surface after 113° C. aging | None | None | None | None |
| Exudate on surface after 136° C. aging | None | None | Slight | None |
| Loop spew, 48 hours @ 23° C. | Slight | Very slight | Heavy | None |
| VR at 23° C. (ohm · cm) | 3.43E+15 | 3.40E+15 | 1.71E+15 | 6.56E+15 |

TS = Tensile strength, ASTM D638
TSR = Tensile strength retention, ASTM D638
TSR 113° C. = Tensile strength retention, (%), specimen aged at 113° C. for 168 hours
TSR 136° C. = Tensile strength retention, (%), specimen aged at 136° C. for 168 hours
TE = Tensile elongation, ASTM D638
TER = Tensile elongation retention, ASTM D638
TER 113° C. = Tensile elongation retention (%), specimen aged at 113° C. for 168 hours
TER 136° C. = Tensile elongation retention (%), specimen aged at 136° C. for 168 hours
VR = Volume Resistivity
WR = Weight Retained after 168 hours As shown in Table 3, the samples of the present invention: (a) were softer than the comparative samples (i.e., the plasticization efficiency was desirably greater); (b) exhibited excellent properties before and after heat aging (at temperatures up to 136° C.); and (c) showed little or no exudation after being subject to the loop-spew test or aging at elevated temperatures, confirming that the plasticizers are sufficiently compatible with PVC, as previously inferred from the solution temperature measurements.

Example 3

Polymer Compositions with Single-Component Plasticizers

Prepare Samples 6 and 7 (S6 and S7) and Comparative Samples 7-9 (CS7, CS8, and CS9) using the procedures described in Example 2, with the addition of recording the time required for complete plasticizer absorption in step (d) by visual observation. Prepare Samples 6-7 and Comparative Samples 7-9 according to the following formulations in Table 4.

TABLE 4

Sample Compositions for S6-7 and CS7-9

|  | S6 | S7 | CS7 | CS8 | CS9 |
|---|---|---|---|---|---|
| PVC (wt %) | 60.3 | 60.3 | 60.3 | 60.3 | 60.3 |
| Filler (wt %) | 6.4 | 6.4 | 6.4 | 6.4 | 6.4 |
| Heat Stabilizer (wt %) | 3.0 | 3.0 | 3.0 | 3.0 | 3.0 |
| Antioxidant (wt %) | 0.3 | 0.3 | 0.3 | 0.3 | 0.3 |
| S1 (wt %) | 30.0 | — | — | — | — |
| S2 (wt %) | — | 30.0 | — | — | — |
| CS1 (wt %) | — | — | 30.0 | — | — |
| CS3 (wt %) | — | — | — | 30.0 | — |
| CS4 (wt %) | — | — | — | — | 30.0 |
| Total | 100 | 100 | 100 | 100 | 100 |
| Plasticizer parts per hundred resin (phr) | ~50 | ~50 | ~50 | ~50 | ~50 |

Compression mold and analyze the samples as in Example 2. The results are provided in Table 5, below.

TABLE 5

Properties of S6-7 and CS7-9

|  | S6 | S7 | CS7 | CS8 | CS9 |
|---|---|---|---|---|---|
| Dry Blend Time (min.) | 2 | 2 | 8 | 2 | 6 |
| Shore D Hardness | 28.7 ± 0.3 | 27.9 ± 0.2 | 40.1 ± 0.5 | 33.2 ± 0.5 | 36.7 ± 0.7 |
| Shore A Hardness | 84.8 ± 0.1 | 84.4 ± 0.2 | 96.0 ± 0.4 | 87.4 ± 0.4 | 91.0 ± 0.2 |
| TS, un-aged (psi) | 3229 ± 261 | 3077 ± 358 | 1101 ± 263 | 3160 ± 262 | 2886 ± 270 |
| TSR, after 113° C. aging (%) | 105 ± 9 | 114 ± 22 | 134 ± 16 | 106 ± 15 | 117 ± 14 |
| TSR, after 136° C. aging (%) | 206 ± 9 | 230 ± 41 | 149 ± 46 | 109 ± 11 | 120 ± 28 |
| TE, un-aged (psi) | 317 ± 23 | 320 ± 24 | 55 ± 28 | 283 ± 21 | 250 ± 20 |
| TER, after 113° C. aging (%) | 86 ± 4 | 97 ± 8 | 42 ± 53 | 102 ± 19 | 114 ± 17 |
| TER, after 136° C. aging (%) | 1 ± 0 | 1 ± 0 | 16 ± 34 | 98 ± 9 | 98 ± 37 |
| WR, after 136° C. aging (%) | 79.3 | 80.6 | 89.1 | 99.4 | 97.1 |
| Exudate on surface after 113° C. aging | None | None | Heavy | None | Slight |
| Exudate on surface after 136° C. aging | None | None | Heavy | None | None |
| Loop spew, 48 hours @ 23° C. | Slight | Slight | Heavy | Slight | None |
| VR at 23° C. (ohm · cm) | 8.58E+14 | 1.04E+15 | 3.46E+14 | 3.27E+15 | 8.21E+15 |

TS = Tensile strength, ASTM D638
TSR = Tensile strength retention, ASTM D638
TSR 113° C. = Tensile strength retention, (%), specimen aged at 113° C. for 168 hours
TSR 136° C. = Tensile strength retention, (%), specimen aged at 136° C. for 168 hours
TE = Tensile elongation, ASTM D638
TER = Tensile elongation retention, ASTM D638
TER 113° C. = Tensile elongation retention (%), specimen aged at 113° C. for 168 hours
TER 136° C. = Tensile elongation retention (%), specimen aged at 136° C. for 168 hours
VR = Volume Resistivity
WR = Weight Retained after 168 hours As shown in Table 5, the samples of the present invention: (a) exhibited rapid plasticizer uptake (as evidenced by short dry blend times); (b) were softer than the comparative samples (i.e., the plasticization efficiency was desirably greater); (c) exhibited excellent properties before and after heat aging (at a temperature of 113° C.); and (d) showed little or no exudation after being subject to the loop-spew test or aging at elevated temperatures, confirming that the plasticizers are sufficiently compatible with PVC.

The invention claimed is:
1. A polymeric composition comprising:
    (a) a vinyl chloride resin; and
    (b) a plasticizer comprising an acetylated polyol hydroxystearate,
    wherein said acetylated polyol hydroxystearate comprises acetylated polyol monohydroxystearate in an amount of at least 70 weight percent, based on the entire weight of the acetylated polyol hydroxystearate,
    wherein the polyol of said acetylated polyol hydroxystearate is not glycerol.
2. The composition of claim 1, wherein said vinyl chloride resin has a solution temperature of less than 180° C. in said plasticizer, as determined by Deutsches Institut für Normung ("DIN") standard method 53 408.
3. The composition of claim 1, wherein the polyol of said acetylated polyol hydroxystearate is selected from the group consisting of alkylene glycols, triethylene glycol, trimethylolethane, trimethylolpropane, pentaerythritol, mannitol, sorbitol, and mixtures of two or more thereof.
4. The composition of claim 3, wherein said polyol is an alkylene glycol, wherein said alkylene glycol is selected from the group consisting of ethylene glycol, propylene glycol, 1,3-butanediol, 1,4-butanediol, 2-ethyl-1,3-hexanediol, 2-methyl-2-propyl-1,3-propanediol, and mixtures of two or more thereof.

5. The composition of claim 4, wherein said alkylene glycol is propylene glycol.

6. The composition of claim 1, wherein said polymeric composition has a Shore D hardness of less than 34 when said plasticizer is present in an amount of 50 parts per hundred resin based on 100 parts by weight of the vinyl chloride resin, wherein said polymeric composition has a tensile elongation retention of at least 30% when aged at 113° C. for 168 hours, as determined by ASTM D638.

7. The composition of claim 1, wherein said plasticizer further comprises an additional plasticizer component selected from the group consisting of an epoxidized natural oil, an epoxidized fatty acid alkyl ester, or mixtures thereof.

8. The composition of claim 7, wherein said additional plasticizer component is an epoxidized soybean oil.

9. A coated conductor comprising a conductive core and a polymeric layer surrounding at least a portion of said conductive core, wherein said polymeric composition of claim 1 constitutes said polymeric layer.

10. The coated conductor of claim 9, wherein said coated conductor is a 60° C., 75° C., 80° C., 90° C., or 105° C. rated cable according to Underwriters Laboratories ("UL") standards 83 and 1581 under dry conditions.

* * * * *